United States Patent [19]
Adamski et al.

[11] Patent Number: 5,938,962
[45] Date of Patent: Aug. 17, 1999

[54] APPARATUS FOR DETECTING A CHARACTERISTIC OF A PRODUCT UNDERGOING HEATING

[75] Inventors: Joseph R. Adamski; Jonathan S. Petty, both of Cedar Rapids; Michael A. Estenson, Ely, all of Iowa

[73] Assignee: Amana Company, L.P., Amana, Iowa

[21] Appl. No.: 08/613,702

[22] Filed: Mar. 11, 1996

[51] Int. Cl.$^6$ ................................................. H05B 1/02
[52] U.S. Cl. .................. 219/502; 219/497; 219/518; 219/506; 374/130; 364/557; 99/451; 99/325
[58] Field of Search ................................. 219/502, 501, 219/505, 492, 497, 518, 519, 506; 374/130, 131; 364/571.01, 557; 49/325, 451

[56] References Cited

U.S. PATENT DOCUMENTS

| | | | |
|---|---|---|---|
| 3,956,978 | 5/1976 | Borley | 219/502 |
| 4,245,148 | 1/1981 | Gisske et al. | 219/492 |
| 4,426,572 | 1/1984 | Tachikawa et al. | 219/502 |
| 4,845,647 | 7/1989 | Dils et al. | 250/339 |
| 5,126,536 | 6/1992 | Devlin | 219/497 |
| 5,128,521 | 7/1992 | Lanno et al. | 219/518 |
| 5,283,418 | 2/1994 | Bellows et al. | 219/130.01 |
| 5,517,420 | 5/1996 | Kinsman et al. | 364/474.08 |

*Primary Examiner*—Mark Paschall
*Attorney, Agent, or Firm*—Tobor & Goldstein, LLP.

[57] ABSTRACT

Apparatus for detecting a characteristic of a product undergoing heating senses a parameter of reflected light from the product and determines a point at which the sensed parameter reaches a certain level to detect the characteristic.

11 Claims, 4 Drawing Sheets

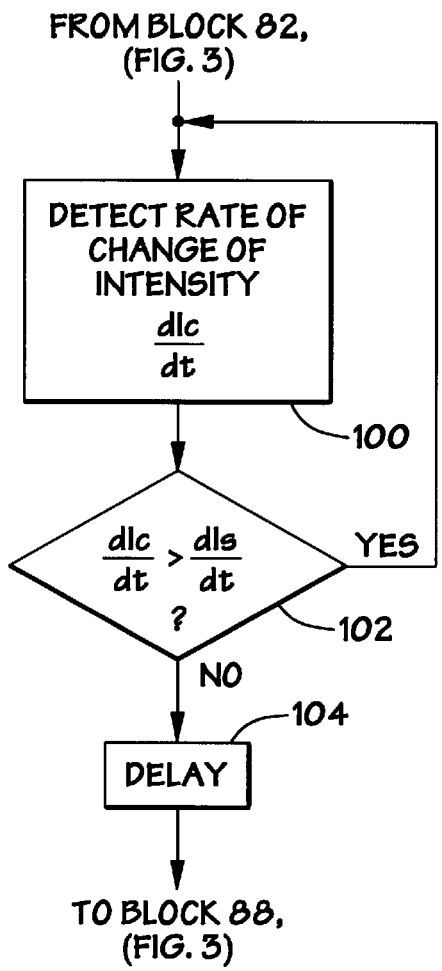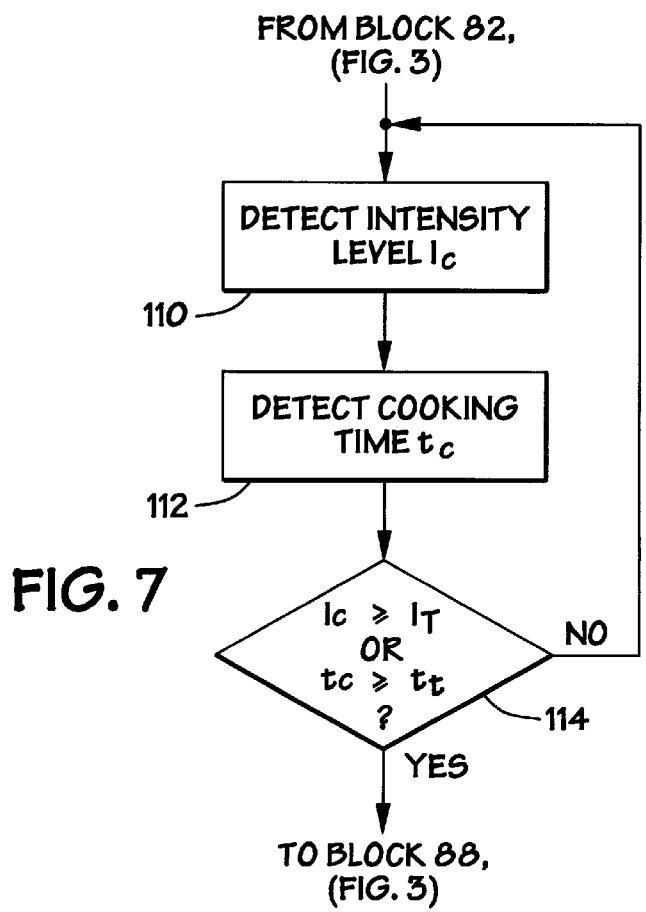
FIG. 6
FIG. 7

APPARATUS FOR DETECTING A CHARACTERISTIC OF A PRODUCT UNDERGOING HEATING

TECHNICAL FIELD

The present invention relates generally to sensing apparatus, and more particularly to an apparatus which detects a characteristic of a heated product.

BACKGROUND ART

Often, it is desired to detect a characteristic of a product undergoing heating so that action with respect to the heated product may be taken. For example, it may be necessary to detect when a product undergoing cooking has reached a desired doneness so that the source of heat for the cooking process can be deactuated. One known apparatus comprises a toaster which typically detects the temperature near a surface of piece of bread to determine when the bread has been toasted to a desired doneness. However, it has been found that the temperature near the surface of a product undergoing cooking can be a poor indicator of doneness.

In view of the foregoing difficulty, and/or where other products are to undergo heating, it may prove desirable to sense one or more additional or alternative characteristics, for example food surface color change, exhaust air odor change, onset of steaming, boiling rate and/or sizzling sounds. The need to sense product doneness is particularly important in high power cooking devices, such as a high speed light oven. Typically, such an oven is controlled by an operator, who visually observes the product undergoing heating and, when the desired brownness of the food product is detected, the food item is removed from the oven or the oven is shut off. However, in a high speed light oven, brownness is not easily detected due to the extremely high intensity of light present in the cooking cavity causing everything to appear white hot. The ability of an operator to detect surface brownness is thus impaired, thereby leading to poor or even disastrous cooking results, such as undercooking, overcooking, boil-over and possible blackening and ignition of the food product. Because of the foregoing problems, automatic control is highly desirable if not essential, especially for commercial cooking products where menu items must be cooked consistently in high volume day after day.

SUMMARY OF THE INVENTION

An apparatus according to the present invention permits detection of a characteristic of a product undergoing heating so that the detected characteristic can be used to terminate or otherwise affect the heating process.

More particularly, according to one aspect of the present invention, an apparatus for detecting a characteristic of a product undergoing heating includes means for sensing a parameter of reflected light from the product and means responsive to the sensing means for determining a point at which the sensed parameter reaches a certain level to detect the characteristic.

Preferably, the parameter of reflected light comprises light intensity. Also preferably, the sensing means comprises a photodetector. If desired, the determining means may comprise a computer wherein the computer may be further responsive to heating time.

The computer may be operable in a training mode of operation during which an operator establishes the certain level and may be further operable in a control mode of operation to control product heating in response to the sensed parameter.

If desired, the determining means may terminate further heating when the characteristic is detected.

According to a further aspect of the present invention, apparatus for detecting brownness of a food product undergoing cooking in a light oven includes a sensor for sensing reflected light intensity from the product and means responsive to the sensor for determining a point at which the reflected light intensity reaches a certain level.

In accordance with yet another aspect of the present invention, apparatus for controlling a light oven includes means for detecting brownness of a product cooked in the light oven and a process control computer responsive to the detected brownness for deactuating the light oven when a brownness level is detected.

The apparatus of the present invention can be used to detect a characteristic of an item undergoing heating so that the heating process can be terminated or otherwise modified. Thus, consistency from one heating process to the next can be achieved.

BRIEF DESCRIPTION OF THE DRAWINGS

FIGS. 4, 6 and 7 are flow charts illustrating alternative programming for implementing the block 84 of FIG. 3.

DESCRIPTION OF THE PREFERRED EMBODIMENTS

Figure 1:
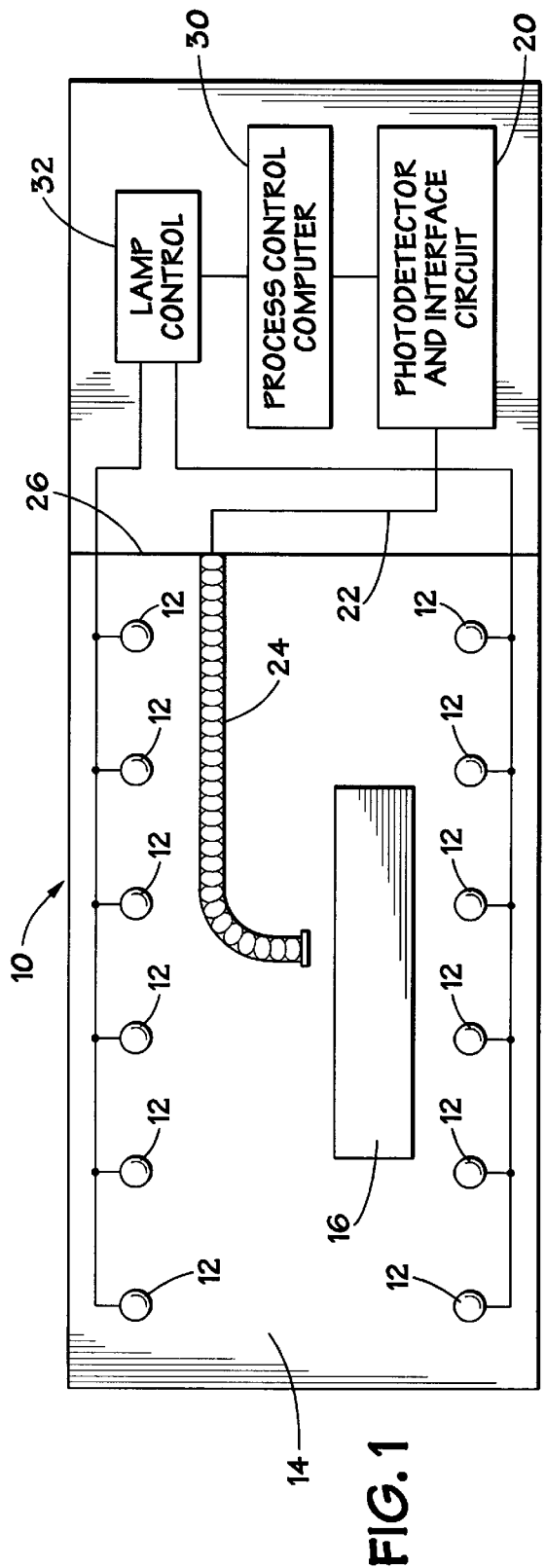
FIG. 1 comprises a combined diagrammatic view and block diagram of a light oven incorporating the apparatus of the present invention.

FIG. 1 diagrammatically illustrates a light oven 10 which may incorporate the present invention. The light oven 10 includes a series of lamps 12, which may be of the quartz halogen tungsten type or of the quartz arc type and which are disposed within an oven cavity 14. The lamps are operated to emit high power densities of visible light which impinge on a food product 16 disposed in the oven cavity 14. The number and arrangement of lamps 12 are not important to an understanding of the present invention and hence will not be described in greater detail herein.

A photodetector and interface circuit 20 receives light reflected from the product 16 and transmitted by a fiber optic element 22. The fiber optic element is held in place by a flexible gooseneck 24 which may be secured to a side wall 26 of the oven 10. Alternatively, the fiber optic element 22 may be secured to a different location, for example, the upper wall of the oven and/or may be maintained in position by any other suitable anchoring apparatus, as desired.

A process control computer 30 is responsive to the output of the photodetector and interface circuit 20 and develops control signals for operating the lamps 12 via a lamp control circuit 32.

Figure 2:
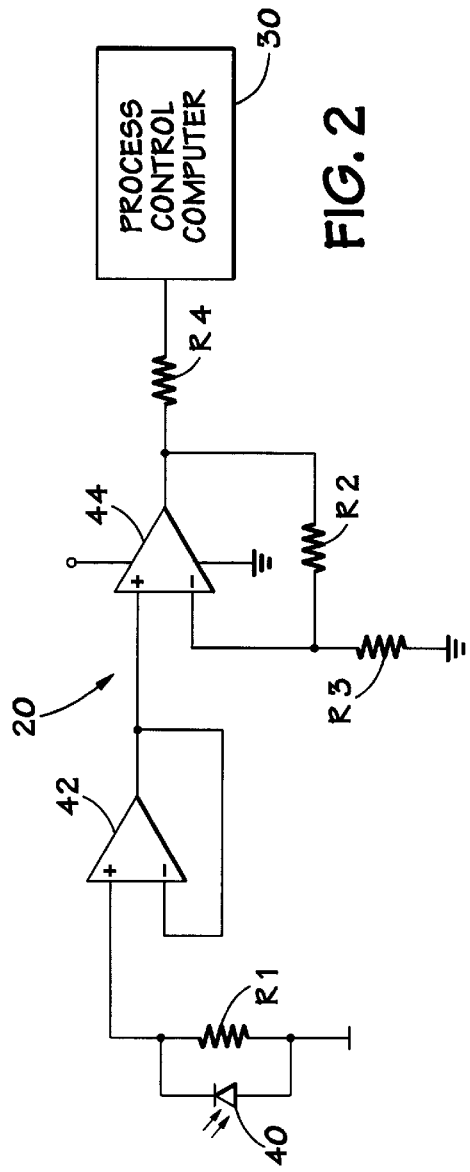
FIG. 2 comprises a schematic diagram of the photodetector and interface circuitry of FIG. 1.

Referring now to FIG. 2, the photodetector and interface circuit 20 includes a photodetector in the form of a photodiode 40 coupled in parallel with a resistor R1 between a noninverting input of an op amp 42 connected in a voltage follower configuration and ground potential. An output of the op amp 42 is connected to a noninverting input of a further op amp 44 wherein the latter provides gain for the signal developed by the op amp 42 at a gain factor determined by the values of resistors R2, R3 coupled between an output of the op amp 44 and ground potential. Further, a node between the resistors R2 and R3 is coupled to an inverting input of the op amp 44.

The output of the op amp 44 is coupled through a resistor R4 to the process control computer 30 described above.

If desired, the fiber optic element 22 may be dispensed with, and the photodiode 40 may be located in the oven cavity 14, for example, at a position above the food product 16. A collimator may be positioned between the food product 16 and the photodiode 40.

Alternatively, the single fiber optic element 22 may be replaced by a plurality of strands of fiber optic material. First ends of the plurality of strands may be positioned by any desired means at various points in the oven cavity 14 to detect reflected light intensity levels at such points. Second ends of the strands are bundled together and the combined light from the strands are directed onto the photodiode 40 so that the latter detects, in effect, the integrated light intensity over the surface of the food product 16. The optical fiber strands and associated apparatus for guiding the light transmitted thereby may comprise the fiber optic sables and associated apparatus disclosed in U.S. Pat. No. 41,963,714, owned by the assignee of the present invention and the disclosure of which is hereby incorporated by reference herein.

Figure 3:
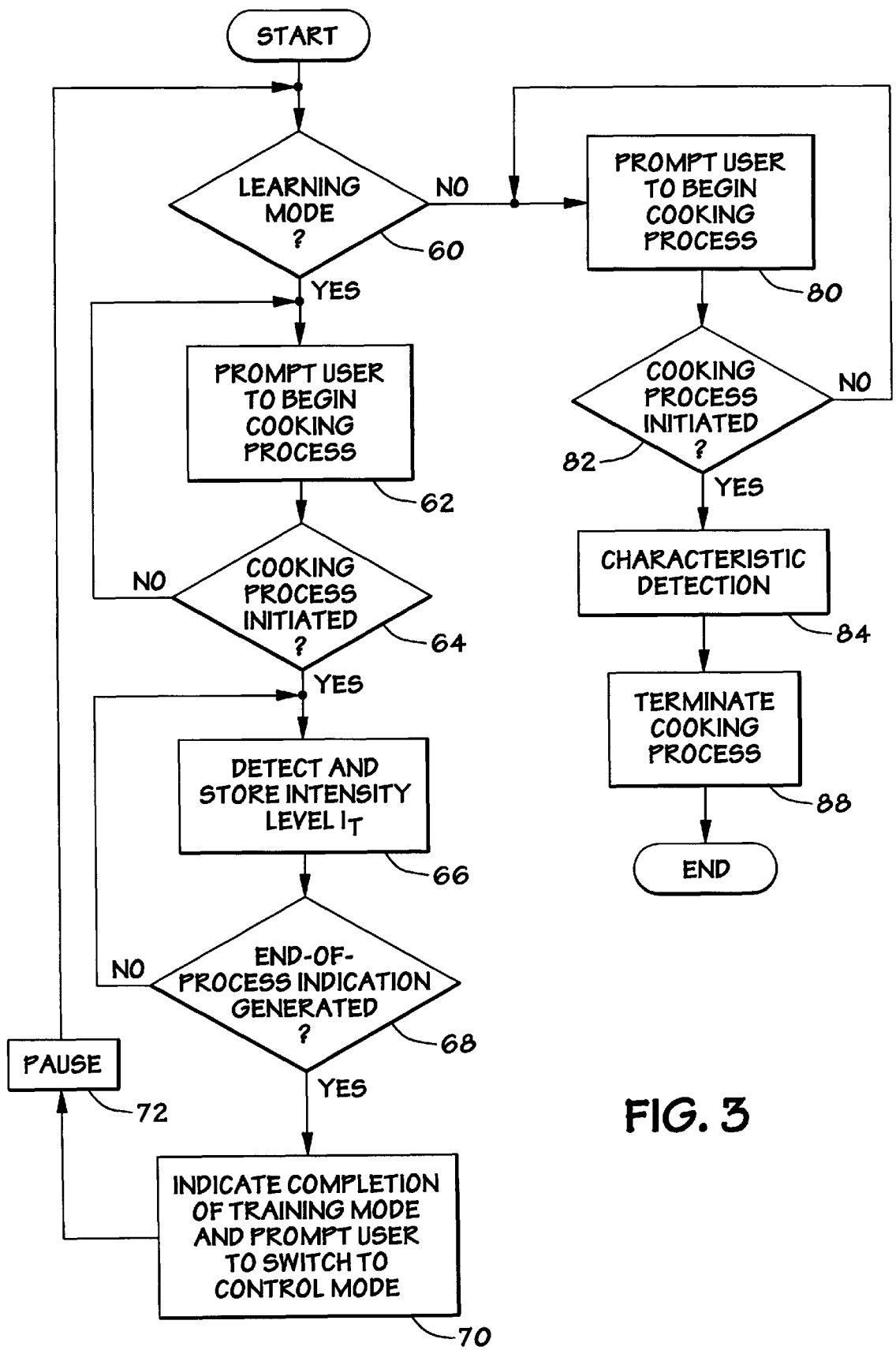
FIG. 3 comprises a flow chart illustrating programing executed by the process control computer of FIG. 1 to implement the present invention.

FIG. 3 illustrates a first example of programming executed by the process control computer 30 to control the oven 10. The programming is operable in either a learning mode of operation to set up the control computer 30 for later use or a control mode of operation to control the cooking operation in response to a sensed parameter of reflected light from the product 16. The programming begins at a block 60 which checks to determine whether operation in the learning mode should be initiated. This operation can be either requested by an operator or user, for example, by moving a switch mounted on the oven to a particular position, or the learning mode can be automatically entered upon initial energization of the process control computer 30 and/or following a power interruption thereto. Alternatively, any other methodology for entering the learning mode may be implemented. If the block 60 determines that the learning mode has been requested, a block 62 prompts a user by a visual or other indication to place product in the oven 10 and begin the cooking process. A block 64 then checks to determine whether the cooking process has been initiated. Control remains with the blocks 62 and 64 until the oven 10 has been turned on by the operator, whereupon a block 66 converts the analog output of the photodetector and interface circuit 20 into a digital signal and stores same as a reflected intensity level $I_T$ in a memory of the process control computer 30.

Following the block 66, a block 68 checks to determine whether an end-of-process indication has been generated. This indication may be generated by any convenient means, for example by the operator actuating a switch, or by the operator turning off the oven or the like. If the end-of-process indication has not been generated, control returns to the block 66. Otherwise, a block 70 develops an indication of completion of the training mode and prompts the user to switch to the control mode of operation. This indication may be developed by a visual or other indicator.

Following the block 70, control pauses at a block 72 for either a fixed period of time or until the user actuates a switch to command operation in the control mode.

If desired, entry into the control mode may be automatically affected by the block 70, in which case the block 72 would not be required.

When the block 60 determines that the learning mode of operation has not been requested, control passes to a block 80 which prompts the user to insert product in the oven 10 and begin the cooking process. Once a block 82 determines that the cooking process has been initiated, a block 84 senses the output of the photodetector and interface circuit 20 to determine when the characteristic of the product undergoing heating has been detected. Thereafter, a block 88 terminates the cooking process.

Figure 4:
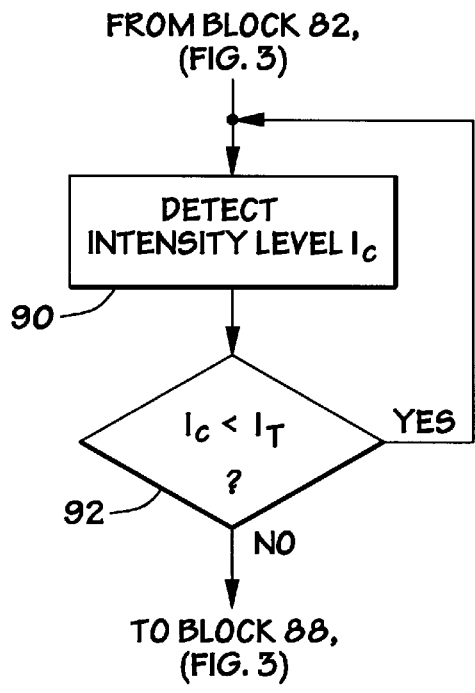

FIG. 4 comprises a flow chart illustrating one example of programming for effecting the function of the block 84 of FIG. 3. In this example, a block 90 senses the output of the photodetector and interface circuit 20 to detect the intensity level $I_C$. A block 92 then checks to determine whether the sensed intensity level $I_C$ is less than the stored intensity level $I_T$ detected by the block 66 of FIG. 3 during the learning mode of operation. If $I_C$ is less than $I_T$, control returns to the block 90 where a new intensity level $I_C$ is detected. The block 92 then again determines whether $I_C$ is less than $I_T$. Control remains with the blocks 90 and 92 until the intensity level $I_C$ equals or exceeds the intensity level $I_T$, at which point control passes to the block 88 of FIG. 3.

As the foregoing discussion demonstrates, an operator performs a one-time training of the computer 30 by visually observing the product 16 as it is browning in the oven 10. When a desired brownness level is achieved, an end-of-process indication is generated by the operator and the output of the photodetector and interface circuit 20 at such point is digitized and stored in the computer 30. Subsequent cooking operations are controlled in accordance with the stored intensity level $I_T$ so that other food items are browned to a substantially identical degree.

Figure 5A:
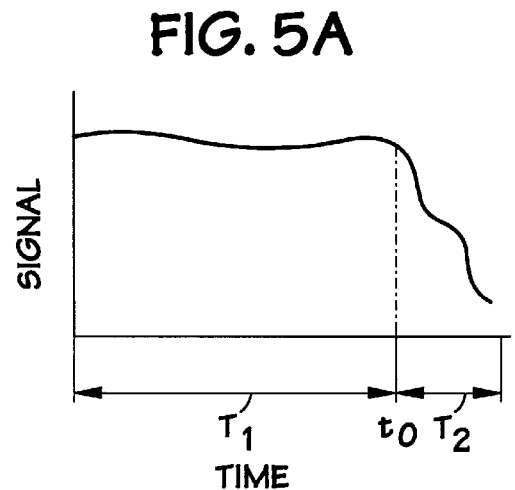
FIGS. 5A–5C are graphs illustrating sample photodetector output voltage as a function of time for the photodiode 40 of FIG. 2.
Figure 5B:
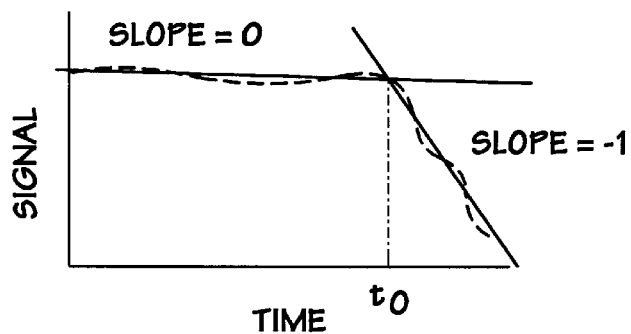
Figure 5C:
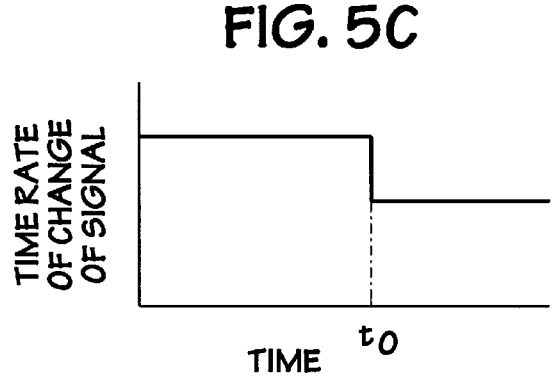

It should be noted that the programming of FIG. 3 can be modified to account for a different characteristic of a product undergoing heating, including rate of change of reflected light intensity, integrated light intensity or any other characteristic. For example, with reference to the curve of FIG. 5A, the output voltage of the photodiode 40 may remain substantially constant during an initial cooking time period $T_1$, and may thereafter decrease at a substantially constant rate during a time period $T_2$. As shown in the curve approximation of FIG. 5B wherein the portions of the curve of FIG. 5A are replaced by straight lines, the slope of the output voltage curve changes from zero to a value of −1 at a time $t_O$ between the time periods $T_1$ and $T_2$. The point at which the rate of change of reflected light intensity changes can be used as a reference to determine brownness.

FIG. 6 illustrates alternative programming to implement the characteristic detection block 84 of FIG. 3 where rate of change of reflected light intensity is utilized as an indicator of brownness. Following the block 82 of FIG. 3, a block 100 detects the rate of change of intensity $dI_C/dT$ (which is equivalent to the rate of change of output voltage of the photodiode 40). The value of $dI_C/dT$ is then compared with a stored rate of change magnitude, denoted $dI_S/dT$, and if the former is greater than the latter control returns to the block 100 where a new rate of change of intensity is detected. The new rate of change is thereafter again compared with the stored rate and, when the detected rate of change $dI_C/dT$ is less than or equal to $dI_S/dT$, control either passes directly to the block 86 of FIG. 3 or to a block 104 which imposes a fixed or variable time delay before the cooking process is terminated by the block 88 of FIG. 3. In the embodiment of FIG. 6, the learning mode can be entirely dispensed with, in which case appropriate levels or magnitudes of $dI_S/dT$ and the delay effected by the block 104 (if used) are stored and/or used. Alternatively, the magnitudes of $dI_S/dT$ and the length of the delay period imposed by the block 104 may be determined during a learning mode of operation like that shown in FIG. 3 wherein the product is visually observed during cooking and the rate of change of output voltage of the photodiode 40 is monitored and stored. When an end-of-process indication is generated, the elapsed time from the point at which the rate of change of output voltage switched to an appropriate value (for example −1 in the foregoing example) is stored and is used to establish the delay imposed by the block 104 of FIG. 6.

As a further alternative, surface burning can be detected by sensing periodic and rapid fluctuations in sensor output voltage due to changes in reflected light intensity. If the photodetector is sensitive to infrared radiation, surface boiling of fluids can also be detected.

The programming of FIG. 3 can be modified, if desired, to account for cooking duration. In this embodiment, the block 66 may be modified to not only detect and store the intensity level $I_T$ but also detect and store the length of time since the cooking process was first initiated. Alternatively, a fixed cooking time duration could be stored. The stored cooking time can then thereafter be used to affect subsequent cooking processes. For example, cooking may be terminated when a particular cooking duration has been reached, regardless of whether the intensity level $I_C$ has reached the stored intensity level $I_T$. Alternatively, cooking may be accomplished primarily on a timed basis, but may be terminated if a brownness level is reached before the commanded cooking time is reached. These override operations act as safeguards to minimize the chances of burned product in the event there is a malfunction in the photodetector and interface circuit 20 or where the desired brownness level occupies such a shore period of time as compared to the length of the overall cooking process that there is a substantial chance of failing to detect when the desired brownness level has been reached.

Still further, cooking can be accomplished on a combined times and brownness basis wherein cooking is terminated either when a target cooking time or a target brownness level is reached. FIG. 7 illustrates alternative programming for implementing the function of the block 84 of FIG. 3 to accomplish this result. Following the block 82 of FIG. 3, a block 110 detects the intensity level $I_C$ and a block 112 detects the total cooking time, designated $T_C$. A determination is then made by a block 114 as to whether the intensity level $I_C$ is greater than or equal to $I_T$ (i.e., the intensity level stored by the block 66 of FIG. 3) or whether the time $T_C$ is greater than or equal to a target cooking time $T_T$. The target time $T_T$ may either be selected and manually stored in the memory of the computer 30 or may be developed and stored during the training mode by the block 66 of FIG. 3 when the end-of-process indication is generated. If neither of the foregoing conditions is true, control returns to the blocks 110 and 112 and a new determination is thereafter made by the block 114 if either condition is true. If and when this is found to be the case, control passes to the block 86 of FIG. 3 where the cooking process is terminated.

The present invention eliminates the effect that initial temperature variations have on open-loop timed processes. The invention is not limited to use in a light oven, but may be used in any heating apparatus.

Listed below are sample values for the components of FIG. 2, it being understood that these values are not limiting in the sense that alternative circuitry for interfacing the photodetector 40 with the computer 30 could be used (values are in ohms):

| | |
|---|---|
| R1 | 1M |
| R2 | 24K |
| R3 | 10K |
| R4 | 1K |

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. Apparatus for detecting a characteristic of a product undergoing heating, comprising:

means for sensing a parameter of reflected light from a plurality of discrete separated points of the product, the sensing means including a plurality of optical fibers coupled to a single light detector; and means responsive to the sensing means for determining a point at which the sensed parameter reaches a certain level to detect the characteristic.

2. The apparatus of claim 1, wherein the parameter of reflected light comprises light intensity.

3. The apparatus of claim 1, wherein the sensing means comprises a photodetector.

4. The apparatus of claim 1, wherein the determining means comprises a computer.

5. The apparatus of claim 4, in combination with a heating device controlled by the computer, wherein the computer is further responsive to heating time to control the heating element.

6. The apparatus of claim 4, wherein the computer is operable in a training mode of operation during which an operator establishes the certain level and is further operable in a control mode of operation to control product heating in response to the sensed parameter.

7. The apparatus of claim 1, wherein the determining means includes means for terminating further heating when the characteristic is detected.

8. Apparatus for controlling a light oven, comprising:

means for detecting brownness of a product cooked in the light oven including a plurality of optical fibers coupled to a single photodetector; and a process control computer responsive to the detected brownness and further responsive to cooking time for deactuating the light oven when a brownness level is detected or when a particular cooking time is reached.

9. The apparatus of claim 8, wherein the detecting means comprises interface circuitry coupled between the photodetector and the process control computer.

10. The apparatus of claim 9, wherein the photodiode detects light intensity reflected off the product.

11. The apparatus of claim 1, wherein the process control computer is operable in a training mode of operation during which an operator establishes the certain level and is further operable in a control mode of operation to control product cooking in response to the sensed parameter.

\* \* \* \* \*